United States Patent [19]

Nishimura

[11] Patent Number: 5,245,430
[45] Date of Patent: Sep. 14, 1993

[54] TIMEBASE CORRECTOR WITH DROP-OUT COMPENSATION

[75] Inventor: Hajime Nishimura, Tokyo, Japan

[73] Assignee: Sony Corporation, Tokyo, Japan

[21] Appl. No.: 652,197

[22] Filed: Feb. 6, 1991

[30] Foreign Application Priority Data

Feb. 8, 1990 [JP] Japan .................................. 2-29274
Nov. 26, 1990 [JP] Japan .......................... 2-124077[U]

[51] Int. Cl.⁵ .......................... H04N 5/04; H04N 5/08
[52] U.S. Cl. .................................... 358/149; 358/150; 358/314; 358/336
[58] Field of Search .................. 358/149, 148, 17, 155, 358/150, 336, 337, 163, 167, 158, 314; 360/38.1

[56] References Cited

U.S. PATENT DOCUMENTS

| | | | |
|---|---|---|---|
| 4,054,903 | 10/1977 | Ninomiya | 358/314 |
| 4,733,312 | 3/1988 | Morimoto | 360/10.1 |
| 4,766,495 | 8/1988 | Kobayashi et al. | 358/148 |
| 4,974,082 | 11/1990 | Heitmann | 358/148 |

FOREIGN PATENT DOCUMENTS

| | | | |
|---|---|---|---|
| 58-111588 | 7/1983 | Japan | 358/148 |
| 60-04385 | 1/1985 | Japan | 358/314 |

Primary Examiner—Victor R. Kostak
Assistant Examiner—S. Metjahic
Attorney, Agent, or Firm—Philip M. Shaw, Jr.

[57] ABSTRACT

A timebase corrector is provided, in which an input video signal is written in a timebase error correcting memory on the basis of a clock pulse synchronized with a synchronizing signal in the input video signal and the signal written in the time base error correcting memory is read out on the basis of a read clock pulse synchronized with a reference signal to thereby correct a timebase error. In this timebase corrector, when a drop-out of a first vertical synchronizing signal in the input video signal occurs, the write of the input video signal in the timebase error correcting memory is inhibited, and a timebase error is corrected by the input video signal already written in the memory until a second vertical synchronizing signal is detected.

3 Claims, 7 Drawing Sheets

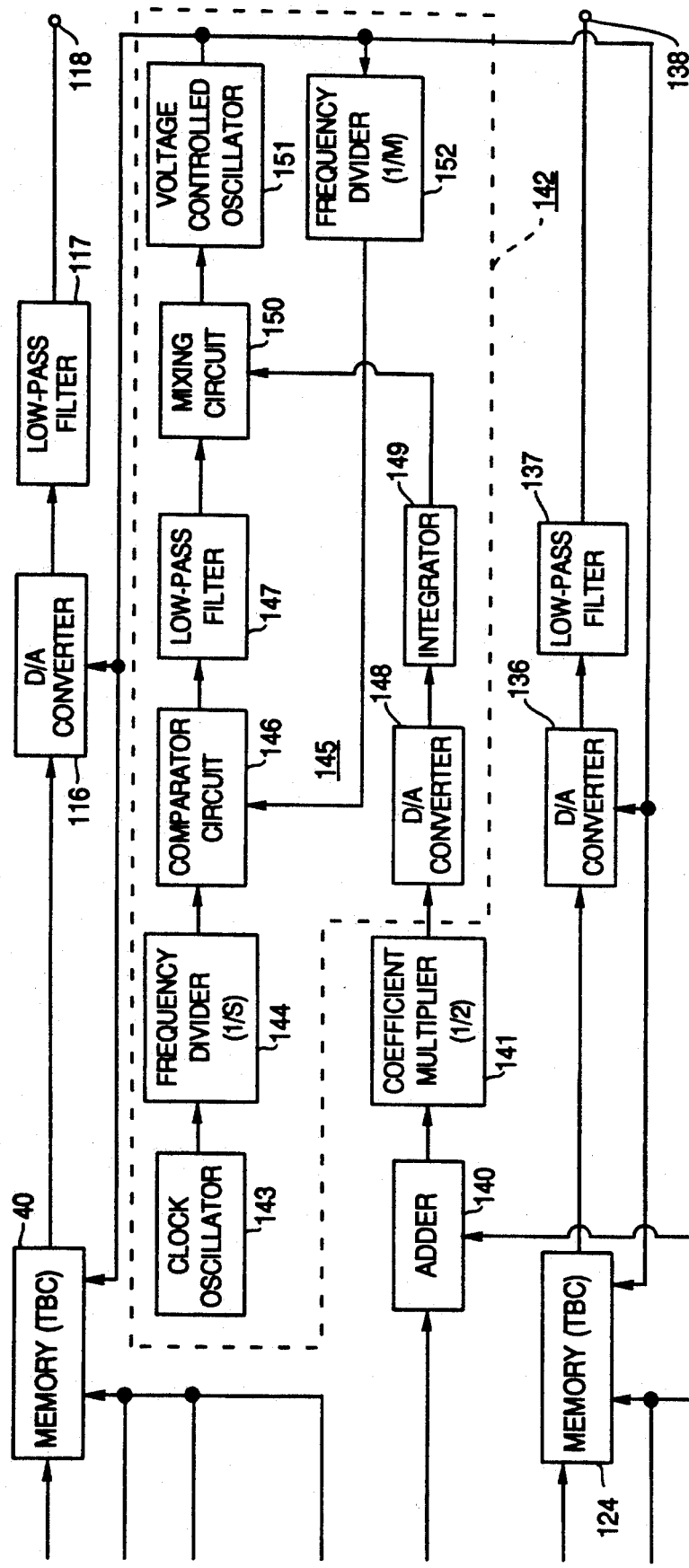
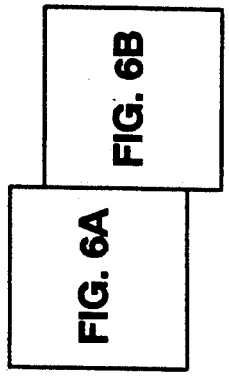
FIG. 6
FIG. 6A
FIG. 6B
FIG. 6B

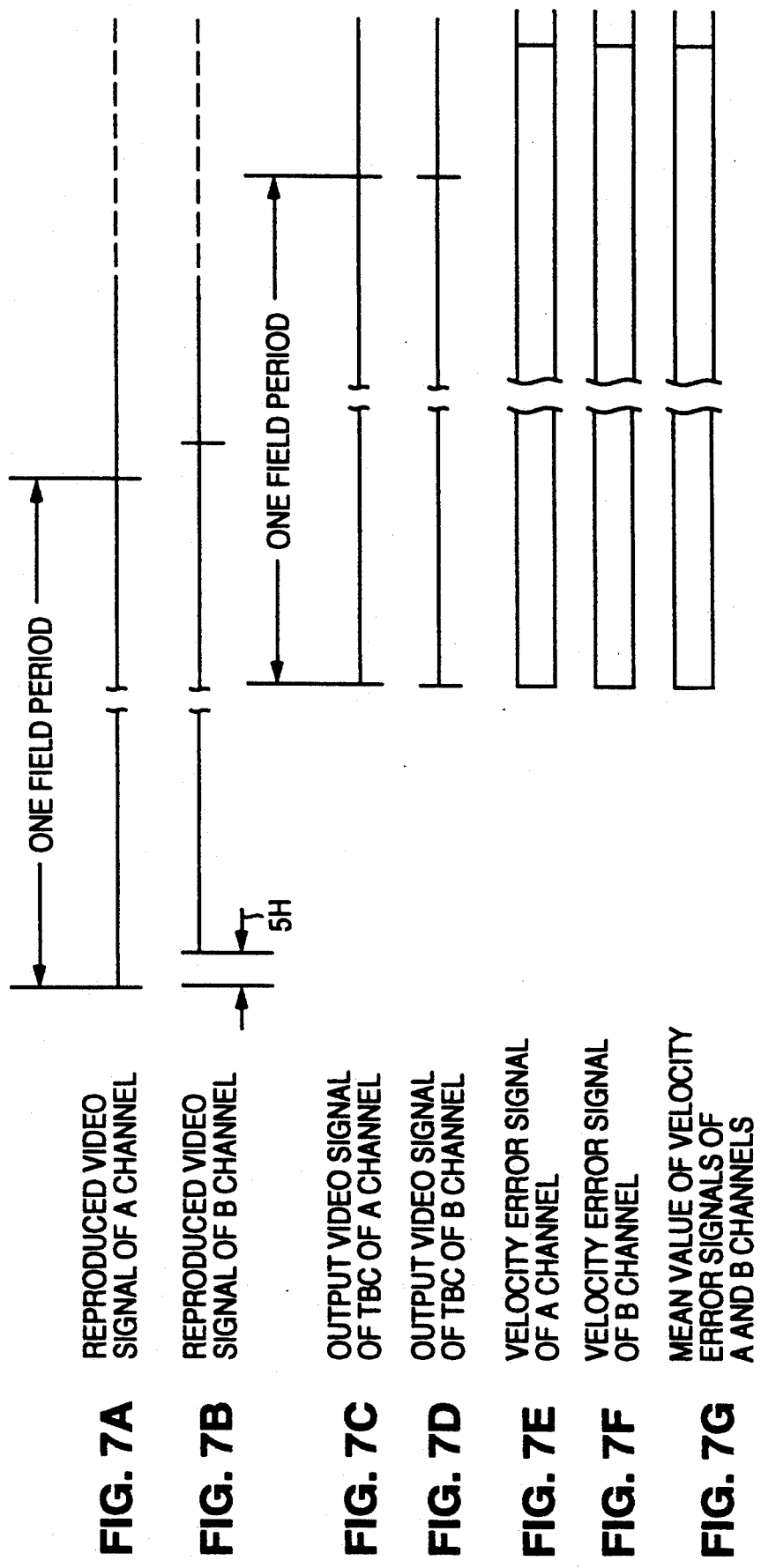

TIMEBASE CORRECTOR WITH DROP-OUT COMPENSATION

BACKGROUND OF THE INVENTION

1. Field of the Invention

The present invention generally relates to timebase error correcting apparatus (i.e., timebase corrector) and, more particularly, is directed to a timebase corrector having a velocity error correction function and which is suitable for use with a home video tape recorder (VTR).

2. Description of the Prior Art

In most of the home video tape recorders now commercially available on the market, a color signal down converting system is employed, in which a color signal is down converted and the down converted signal is re-converted to the signal of original band by a heterodyne system in the playback mode. A timebase fluctuated component of a chroma signal is removed by a double heterodyne method utilizing a quartz oscillator and a timebase fluctuated component of a luminance signal is corrected by an automatic frequency control (AFC) circuit in a horizontal scanning circuit in a television receiver so that a timebase corrector is not needed generally. On the other hand, in a professional video tape recorder of direct color process system (e.g., one-inch helical scan type video tape recorder, a 4-head video tape recorder and so on), a timebase corrector is frequently used because a luminance signal and a chroma signal are not separated and also an interleave relationship must be maintained therebetween.

An example of a conventional timebase corrector will be explained with reference to a schematic block diagram forming FIG. 1.

Referring to FIG. 1, a video signal to be timebase-corrected is applied to an input terminal 1, and is fed to an analog-to-digital (A/D) converting circuit 2 and a write clock generating circuit 3. The write clock generating circuit 3 generates a write clock which is coincident with a timebase fluctuation involved in the video signal. The luminance signal component having the timebase fluctuation is sampled by the write clock, and the analog video signal is converted into a digital video signal by the A/D converting circuit 2, that is, the analog video signal is pulse code modulated (PCM-modulated) and this PCM video signal is written in a digital memory 4. The digital video signal written in the digital memory 4 is read out by a read clock from a read clock generating circuit 6 to which a reference synchronizing (sync.) frequency is applied, and the thus read-out video signal is reconverted into the analog video signal by a digital-to-analog (D/A) converting circuit 5 to which the read clock is supplied, thereby a video signal whose timebase fluctuation is stabilized being obtained at an output terminal 7.

On the other hand, in the video tape recorder, the clamping and the switching of video heads are performed by utilizing a blanking period (i.e., vertical blanking period) of the video signal. In the case of an NTSC television composite video signal, a vertical synchronizing pulse 8 exists ahead of and behind an equalizing pulse 3H in this blanking period as shown in FIG. 2, and this vertical synchronizing pulse 8 is employed as a reference timebase in the vertical direction of the picture screen.

As described in the example of the prior art, the timebase corrector is not generally employed by the home video tape recorder unlike the professional video tape recorder. Even in the home video tape recorder employing the timebase corrector, if residual error involving the vertical synchronizing pulse is largest when a color burst signal is taken as the reference point of the timebase correction, unlike the professional video tape recorder, it is very difficult to reliably detect a vertical synchronizing signal from a reproduced signal in which a waveform distortion, a skew distortion, a drop-out or the like occur frequently. There is then the large possibility that the reference timebase in the vertical direction of the picture screen will be dropped out. More specifically, if a drop-out, noise 9 or the like enters in the vicinity of the vertical synchronizing pulse 8 during the blanking period as shown in FIG. 2, then the detection of the vertical synchronizing pulse 8 becomes difficult and a picture is disturbed in the vertical direction, deteriorating the image quality considerably.

Further, Japanese Patent Laid-Open Gazette No. 63-194494 describes a color video signal recording method. In this color video signal recording method, first and second color signals of a color video signal, which is composed of a luminance signal and first and second color signals, are converted in a line sequential fashion, timebase-compressed to ¼ and then multiplexed on the luminance signal. Then, by timebase-expanding the multiplexed signal, that is, a color line sequential TCI (time compressed integration) signal about twice so as to be divided into two channel signals and scanning one field period of the two channel signals twice or three times, the color video signal is simultaneously recorded in two slant tracks.

Japanese Patent Application No. 2-51248, which is not yet laid open when the assignee of the present application files this application describes the above-mentioned recording method, a recording apparatus, therefor, a reproducing apparatus thereof, a timebase error correcting apparatus (TBC) provided in the reproducing apparatus and so on.

Examples of the conventional video tape recorder for recording a color video signal on a magnetic tape by the above-mentioned recording method, reproducing the recorded signal from the magnetic tape and a timebase corrector thereof will be explained.

Initially, first and second color signals of a color video signal composed of a luminance signal and first and second color signals (red and blue color difference signals) are converted in a line sequential manner, timebase-compressed to ¼, multiplexed with the luminance signal and the multiplexed signal (i.e., TCI signal) is timebase-expanded to about twice, while a 2-channel signal, obtained by a shuffling process, is supplied to an FM modulator circuit, in which it is FM modulated.

Incidentally, two sets or four of rotary magnetic heads are mounted on a rotary drum of a tape guide device in a close relation and head gaps of the rotary magnetic heads mounted closely to each other are different in azimuth angle. Further, azimuth angles of head gaps of four rotary magnetic heads are selected such that, when four rotary magnetic heads are rotated one turn, the recording azimuth angles of four slant tracks formed on the magnetic tape are sequentially changed as $+\theta$, $-\theta$, $+\theta$ and $-\theta$.

The timebase-expanded TCI signal of one field is recorded such that two sets of slant tracks of two channels are formed on the magnetic tape per revolution by sequentially supplying the FM modulated signals of two channels to the two sets of rotary magnetic heads, and accordingly, the timebase expanded TCI signal of one frame is recorded so as to form four sets of slant tracks of two channels per two revolutions.

In the magnetic tape on which the signal is recorded as described above, signals of two channels on the magnetic tape are reproduced by two sets of another rotary magnetic heads having the same head arrangement and gap azimuth angles as those of the rotary magnetic heads in the recording mode. The reproduced signals of two channels are supplied to and demodulated by respective FM demodulator circuits, demodulated signals are converted in the form of analog to digital signals, written in respective timebase error correcting memories and read out therefrom to thereby correct the timebase error.

A write clock signal containing a jitter, generated on the basis of a horizontal synchronizing signal and a burst signal separated from the FM demodulated timebase expanded TCI signal, is supplied to the two memories upon writing, while a read clock signal obtained from a fixed oscillator is supplied to the two memories upon reading.

The two channel signals from the respective memories are supplied to and decoded by a common luminance signal decoder and a common chrominance signal decoder, that is, luminance signals and line-sequential chrominance signals are extracted respectively from these two channel signals, the luminance signals and the line-sequential chrominance signals are timebase compressed by about a half and the line-sequential chrominance signals are timebase expanded by about four times, converted to simultaneous chrominance signals, and resultant digital luminance signals and digital red and blue color difference signals are converted in the form of digital to analog signal, thereby original luminance signal and red and blue color difference signals being obtained.

On the basis of the horizontal synchronizing signal and the burst signal respectively separated from the FM demodulated and timebase expanded TCI signals of two channels, velocity error signals are generated respectively, and these velocity error signals are stored in memories exclusively used for matching their times with the TCI signals read out from the timebase error correcting memories, the clock signal obtained from the fixed oscillator is phase-modulated by the velocity error signal read from the memory to thereby generate a read clock signal and this read clock signal is supplied to the timebase correcting memory and the D/A converter.

In such conventional timebase error correcting apparatus for a video tape recorder, two sets of circuits are needed in order to correct the timebase errors and velocity errors of the pair of reproduced video signals which result from simultaneously reproducing video signals respectively recorded on the pair of slant tracks on the magnetic tape by the pair of rotary magnetic heads. Thus, the circuit arrangement of the prior-art timebase corrector becomes complicated and the consumption of power is considerably increased.

OBJECTS AND SUMMARY OF THE INVENTION

Accordingly, it is an object of the present invention to provide an improved timebase corrector which can eliminate the aforenoted shortcomings and disadvantages encountered with the prior art.

More specifically, it is an object of the present invention to provide a timebase corrector in which a vertical synchronization can be prevented from being disturbed on a picture screen even when a vertical synchronizing pulse cannot be detected due to a drop-out or the like.

It is another object of the present invention to provide a timebase corrector having a velocity error correction function in which an arrangement thereof can be simplified.

It is a further object of the present invention to provide a timebase corrector having a velocity error correction function in which a power consumption can be reduced.

According to an aspect of the present invention, a timebase corrector in which an input video signal is written in a timebase error correcting memory on the basis of a clock pulse synchronized with a synchronizing signal of the input video signal and a signal written in the timebase error correcting memory is read out on the basis of a read clock pulse synchronized with a reference synchronizing signal to thereby correct a time base of the input video signal, is comprised of write means for writing a video signal, a memory in which the video signal is written by the write means, means for reading a timebase corrected video signal from the memory, first synchronizing separating means for extracting a first synchronizing signal from the video signal, second syncrhonizing separating means for extracting a second syncrhonizing signal from the video signal, write-enable signal generating means for generating a write-enable signal on the basis of the first synchronizing signal to place the memory in a writable state, drop-out detecting means for detecting a drop-out of the second synchronizing signal, and means connected to the write-enable signal generating means for generating a control signal to the write-enable signal generating means by which a writing in the memory by the write means is disabled for as long as the drop-out detecting means detects a drop-out of the second synchronizing signal.

The above, and other objects, features and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 7A to 7G are timing charts, respectively, used to explain operation of the video tape recorder shown in FIG. 6.

DETAILED DESCRIPTION OF THE PREFERRED EMBODIMENTS

Figure 1:
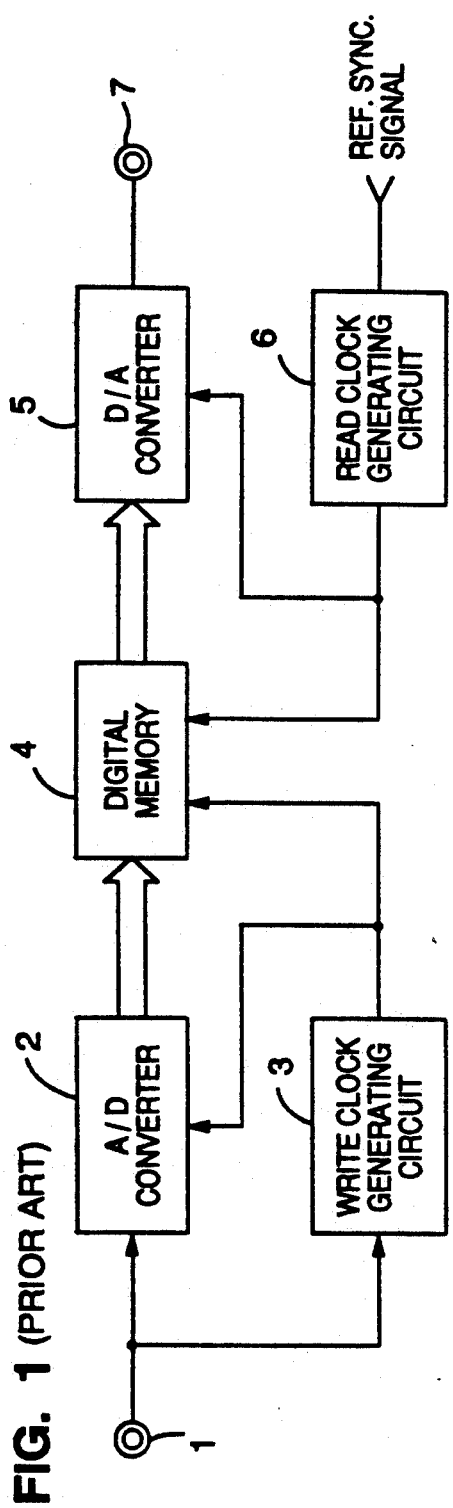
FIG. 1 is a schematic block diagram showing an example of a conventional timebase corrector.
Figure 2:
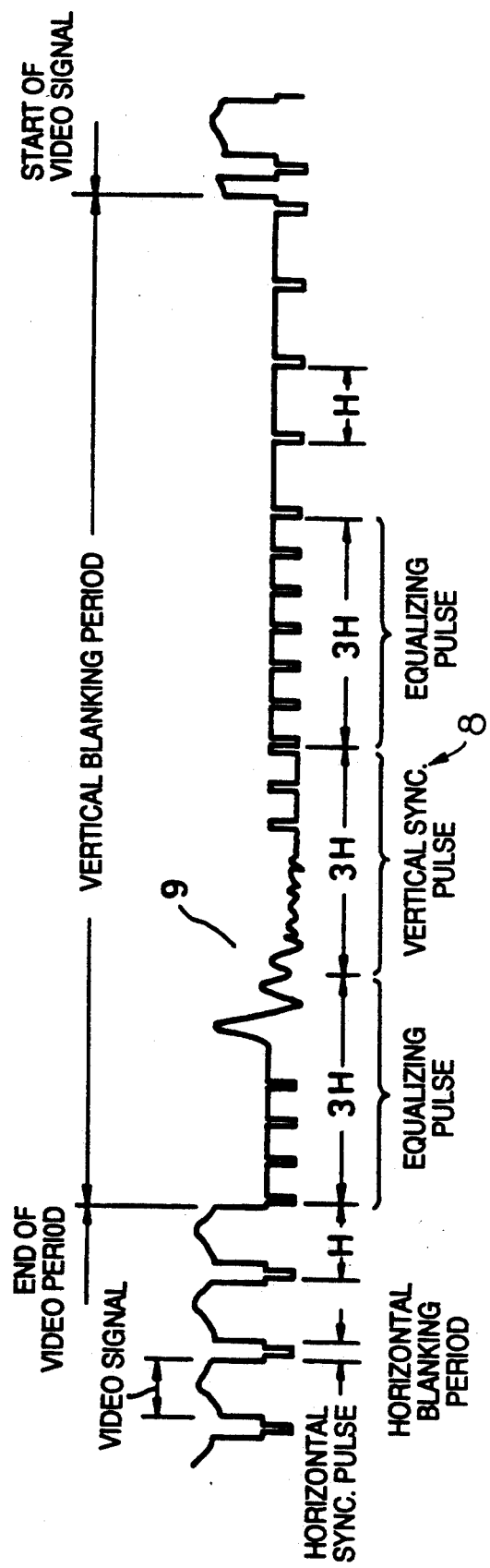
FIG. 2 is a waveform diagram used to explain a waveform of a vertical synchronizing pulse.
Figure 3:
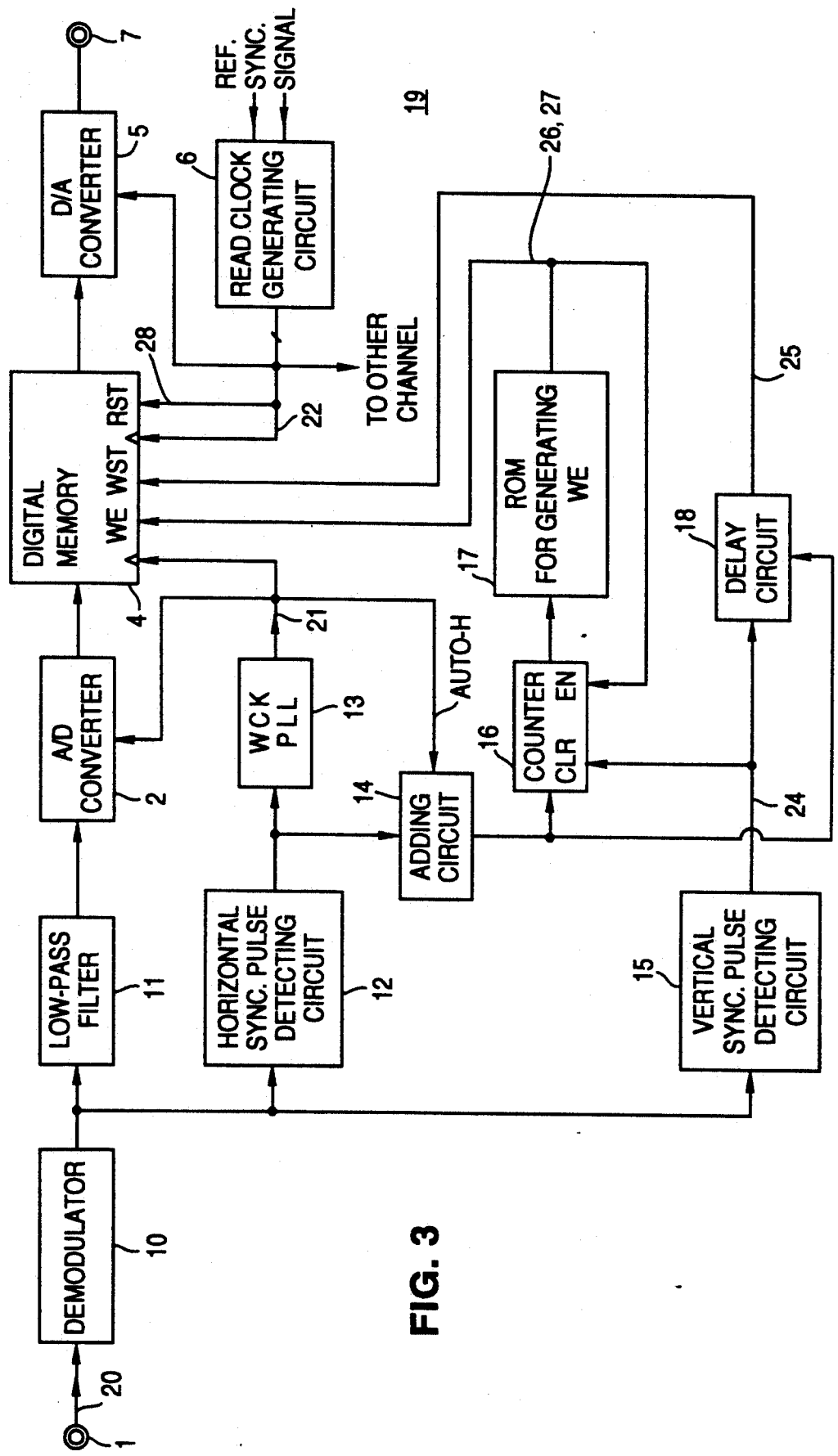
FIG. 3 is a block diagram showing a first embodiment of a timebase corrector according to the present invention.

A first embodiment of the timebase corrector according to the present invention will hereinafter be described with reference to FIG. 3 and FIGS. 4A to 4H. FIG. 3 is a systematic block diagram showing the timebase corrector of the present invention which is applied to the video tape recorder, and FIGS. 4A to 4H are timing waveform diagrams, respectively, used to explain operation of the video tape recorder shown in FIG. 3. In FIG. 3, like parts corresponding to those of FIG. 1 are marked with the same references and therefore need not be described in detail.

Referring to FIG. 3, a reproduced video signal, which results from reproducing a video signal recorded on tape tracks of the video tape recorder by a rotary reproducing head, is supplied to the input terminal 1. This reproduced video signal applied to the input terminal 1 is supplied to a demodulator 10 and is thereby demodulated. The thus demodulated video signal is supplied to a low-pass filter (hereinafter simply referred to as an LPF) 11, through which the signal of band lower than, for example, 6 MHz is passed or the band thereof is limited on behalf of the succeeding A/D converter 2. Then, this processed signal is supplied to the A/D converter 2, in which this analog reproduced video signal is converted into a digital video signal, and the reproduced digital video signal is supplied, for example, to a digital memory and the digital video signal is written in the TBC memory 4.

The reproduced video signal as the output of the demodulator 10 is supplied to a horizontal synchronizing pulse detecting circuit 12 and a vertical synchronizing pulse generating circuit 15 in addition to the low-pass filter 11. In the horizontal synchronizing pulse generating circuit 12, a horizontal synchronizing pulse and a burst signal contained in the reproduced video signal are detected, and the reproduced horizontal synchronizing pulse detected is supplied to a WCK-PLL (phase locked loop) 13 and to an adding circuit 14. In the horizontal synchronizing pulse generating circuit 12, the reproduced horizontal synchronizing pulse is detected from the horizontal synchronizing pulse and the burst signal, and is then fed to the WCK-PLL 13 which constructs the write clock generating circuit 3. The WCK-PLL 13 phase-compares the output of the reproduced horizontal synchronizing pulse with a signal which results from frequency-dividing an output of a voltage controlled oscillator (VCO), and controls an oscillation frequency of the VCO by a resultant error voltage to obtain a write clock pulse 21 following the frequency of the reproduced video signal supplied thereto. This write clock pulse 21 is supplied to the A/D converter 2 and the clock terminal of the TBC memory 4. The PLL 13 includes a counter which counts a clock generated within the PLL 13 when the reproduced horizontal synchronizing pulse cannot be detected. This count output from the counter in the PLL 13 is output to the adding circuit 14 as AUTO-H and therefore the output of the horizontal synchronizing pulse detecting circuit 12 can be prevented from losing the reproduced horizontal synchronizing pulse.

The reproduced horizontal synchronizing pulse from the adding circuit 14 is supplied to a counter 16 and a delay circuit 18 and the counter 16 counts this reproduced horizontal synchronizing pulse.

Figure 4:
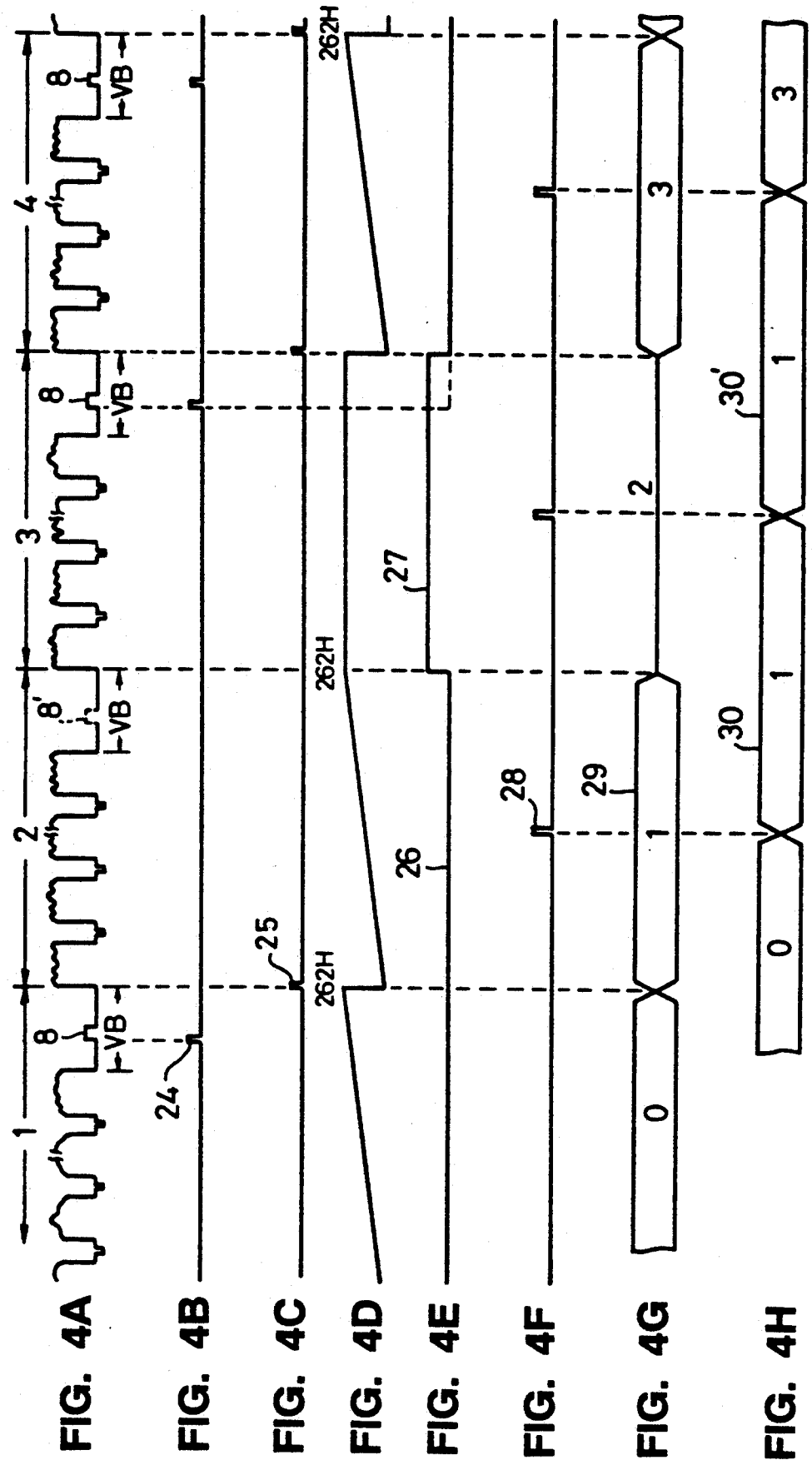
FIGS. 4A to 4H are timing charts, respectively, to which references will be made in explaining operation of the first embodiment of the timebase corrector according to the present invention.

On the other hand, as shown in FIG. 4A, in the reproduced video signal, the vertical synchronizing pulse 8 is involved in the vertical blanking period VB of the vertical fly-back blanking period. This vertical synchronizing pulse 8 is detected by the vertical synchronizing pulse generating circuit 15 shown in FIG. 3 at every field (at every frame or track) as shown in FIG. 4B. FIG. 4B shows the condition such that a vertical synchronizing pulse 8' of the second field could not be detected due to drop-out or the like. As described above, in order to clear the counter 16 by a reproduced vertical synchronizing pulse 24 detected by this vertical synchronizing pulse generating circuit 15, this vertical synchronizing pulse 24 is supplied to the clear terminal CLR of the counter 16 and is also fed to a delay circuit 18. The delay circuit 18 derives a write start signal 25 for the memory 4 as shown in FIG. 4C. The counter 16 counts the reproduced horizontal synchronizing pulse from the adding circuit 14, for example, 262 horizontal synchronizing pulses as shown in FIG. 4D, and if the write start signal 25 is detected, the counter 16 is cleared or starts the counting from the beginning. The count output of the counter 16 is supplied to a ROM (read only memory) 17 for generating a write enable signal for the TBC memory 4, and the ROM 17 uses the output of the counter 16 as an address. If the vertical synchronizing pulse 8 is successively detected, then the ROM 17 generates a low signal 26 as shown in FIG. 4E, while if the vertical synchronizing pulse is dropped even once as shown by the vertical synchronizing pulse 8' in FIG. 4E, then the address output of the counter 16 exceeds one vertical blanking period VB so that the output of the ROM 17 becomes a high level signal 27. If this output is supplied to the write enable terminal EN of the counter 16, the counter 16 stops the count operation as shown in FIG. 4D. Simultaneously, the output of the ROM 17 remains as the high level signal 27 and this state is continued until the next second vertical synchronizing pulse 8 is detected or until the counter 16 is cleared.

The low level signal 26 and the high level signal 27 of the WE signal from the WE generating ROM 17 are supplied to the write enable terminal EN of the TBC memory 4 and only during one field (frame or track) period in which the vertical synchronizing pulse 8 cannot be detected and the high level signal 27 is output, the writing in the TBC memory 4 is inhibited. As a consequence, the writing of the second field period in which vertical synchronizing pulse 8' cannot be detected is inhibited in the TBC memory 4 while writing data 29 is stored in the TBC memory 4.

Next, a read-out start signal 28 for the TBC memory 4 and synchronized correctly with the reference synchronizing signal is supplied to an RST terminal of the TBC memory 4 as shown in FIG. 4F, and the read clock pulse 22 is supplied to the TBC memory 4, whereby the digital video signal from the TBC memory 4 is converted into the analog video signal by the D/A converter 5 and then output to the output terminal 7. A read-out data 30 from the TBC memory 4 at that time is represented in FIG. 4H, in which an interpolated read-out data 30' of the first field portion stored in the TBC memory 4 is output as the data of the second field portion from which the vertical synchronizing pulse 8' is dropped.

According to this embodiment, it is possible to obtain the TBC by which when the vertical synchronizing pulse is not detected, the previous data stored in the TBC memory 4 can be output at a correct timing.

Figure 5:
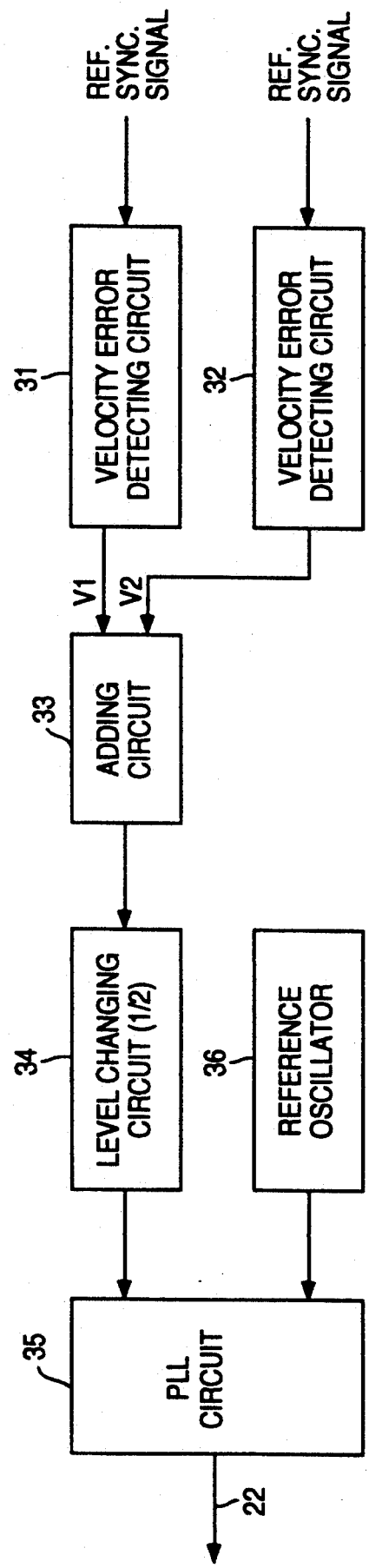
FIG. 5 is a block diagram showing a specific arrangement of a read clock generating circuit used in the present invention.

Further, in the embodiment of the present invention, the read clock generating circuit 6 is arranged as shown in FIG. 5 when one field signal is divided into several tracks and recorded as in a so-called high-vision video tape recorder and so on.

More specifically, when the signals recorded in two tracks in the divided form are reproduced, synchronizing signals contained in the reproduced signals from the two tracks are utilized as a reference synchronizing signal. Referring to FIG. 5, these reproduced synchronizing signals are respectively supplied to velocity error detecting circuits 31, 32 from which there are derived velocity error signals V1 and V2, respectively. These velocity error signals V1 and V2 are added and converted to a mean value by an adder 33 and a level changing circuit 34.

Having considered that the velocity error signals V1, V2 of the reproduced synchronizing signals of the respective tracks have substantially the same waveforms because the magnetic heads (not shown) are arranged very closely, if the velocity error signals V1, V2 are added and averaged, they can be made difficult to be affected by the noise. Further, the read clock generating circuit 6 can be commonly used by respective tracks.

An output of the level changing circuit 34 is supplied to a frequency control terminal of a VCO (not shown) of the PLL circuit 35. An oscillation output of the VCO and an output of a reference oscillator 36 are phase-compared so that the read clock pulse 22 of a predetermined phase and so on are obtained. It is needless to say that the PLL circuit 35 might be PLL circuits that are now commercially available on the market.

While the field memory is utilized as the TBC memory 4 to perform pre-interpolation as described above, the pre-interpolation can be similarly carried out by utilizing the frame memory. Further, when a signal of one field is recorded in a so-called segment recording fashion so that the signal of one field is recorded in several segmented tracks, if a memory of one segment is utilized, a pre-segment interpolation is carried out, if a memory of one field is utilized, a pre-field interpolation is carried out and if a memory of one frame is utilized, a pre-frame interpolation is carried out.

According to the above embodiment of the present invention, it is possible to obtain a timebase corrector in which disturbance of vertical synchronization on a picture can be avoided even when a vertical synchronizing pulse is not detected due to a drop-out or the like.

A second embodiment of the timebase corrector according to the present invention will hereinafter be described with reference to FIG. 6 and FIGS. 7A to 7G. In the second embodiment, the timebase corrector of the present invention is applied to a video tape recorder.

Figure 6A:
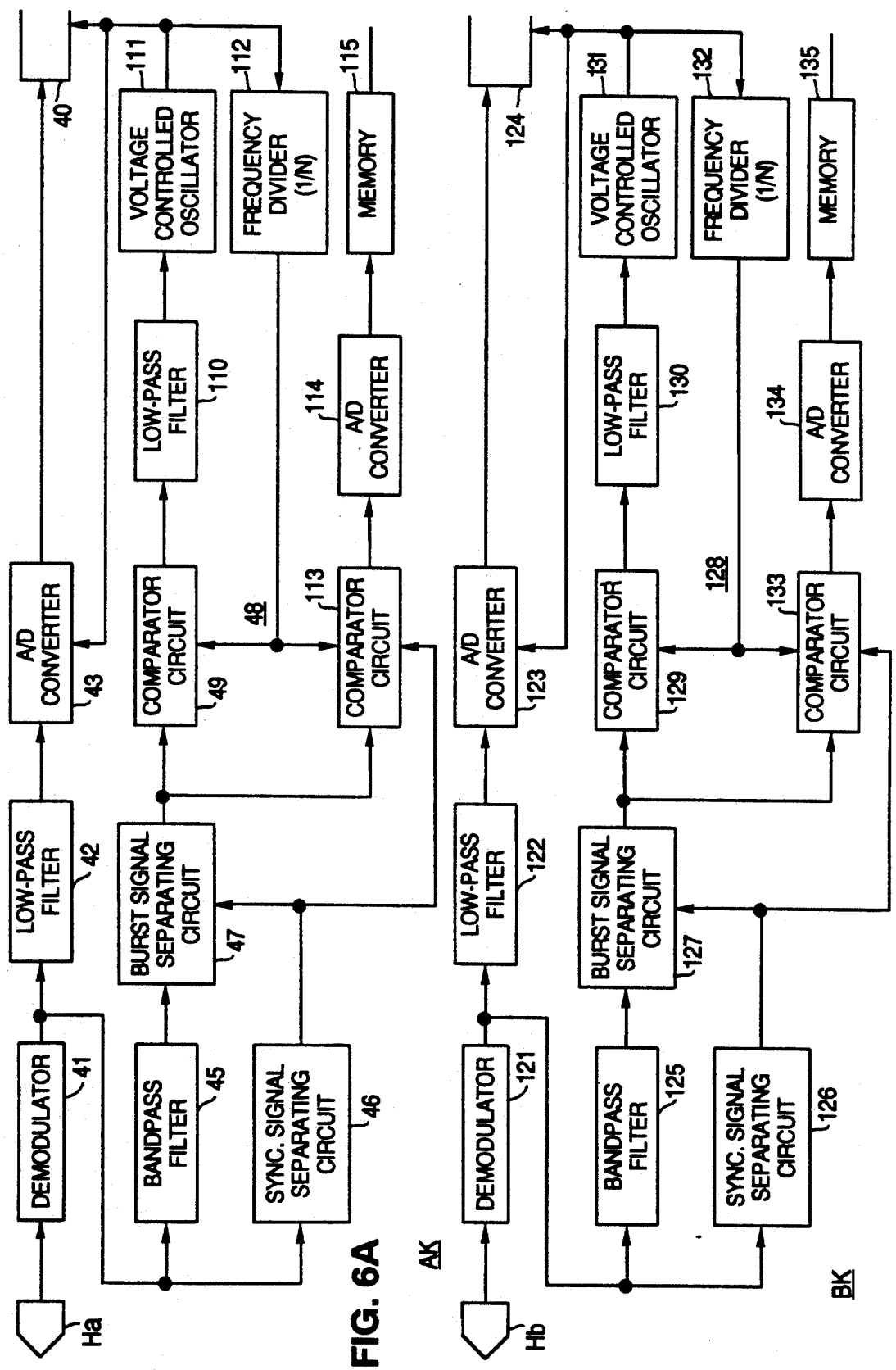
FIG. 6 (formed of FIGS. 6A and 6B drawn on two sheets of drawings so as to permit the use of a suitably large scale) is a block diagram of a second embodiment of the present invention, and illustrating a video tape recorder to which the timebase corrector according to the present invention can be applied.

Initially, a recording circuit of this video tape recorder will be explained in brief and a reproducing circuit will be explained later. In that event, FIG. 6 is formed of FIGS. 6A and 6B drawn on two sheets of drawings so as to permit the use of a suitably large scale.

The recording circuit of the video tape recorder will be described below. First and second color signals of a color video signal formed of a luminance signal and first and second color signals (red and blue color difference signals) are converted in a line sequential manner, timebase-compressed by a timebase compressing ratio of ¼ and then multiplexed with the luminance signal. The resultant multiplexed signal (TCI signal as earlier noted) is timebase-expanded about twice, and two channel signals, provided by the shuffling process, are supplied to and FM-modulated by an FM modulator circuit.

In rotary magnetic heads of two sets or four mounted on a rotary drum of a tape guide apparatus, head gaps of the two rotary magnetic heads closely arrayed are arranged to have different azimuth angles. Further, head gap azimuth angles of four rotary magnetic heads are determined such that, each time the four rotary magnetic heads are rotated once, recording azimuth angles of four slant tracks formed on the magnetic tape may become different as $+\theta$, $-\theta$, $+\theta$, $-\theta$, in that order.

FM modulated signals of two channels are sequentially supplied to the two sets of rotary magnetic heads, whereby the timebase-expanded TCI signal of one field is recorded so that two sets of slant tracks of two channels are formed on the magnetic tape per revolution of the two sets of rotary magnetic heads. Accordingly, the timebase-expanded TCI signal of one frame is recorded so as to form four sets of slant tracks of two channels per two revolutions of the rotaly magnetic heads.

The reproducing circuit will now be described with reference to FIG. 6. The magnetic tape on which the signals are recorded by the above-mentioned recording circuit as described above is reproduced by another two sets of rotary magnetic heads Ha and Hb which are the same as those of the recording circuit in arrangement and in gap azimuth angle, thereby two channel signals recorded on the magnetic tape being reproduced simultaneously.

In FIGS. 6A and 6B, reference letters AK and BK respectively represent independent circuits of the channels A and B which are constructed in the same way, and a read clock generating circuit 142 is made common to the respectively independent circuits AK and BK.

Reproduced signals of two channels, i.e., reproduced signals of four rotary magnetic heads Ha and Hb are supplied, respectively, to FM demodulator circuits 41 and 121, in which they are FM-demodulated to provide timebase-expanded TCI signals, respectively. The timebase-expanded TIC signals are supplied, respectively, to low-pass filters 42, 122, bandpass filters 45, 125 and synchronizing separating circuits 46, 126. Outputs of the bandpass filters 45 and 125 are respectively supplied to burst signal separating circuits 47 and 127. The timebase-expanded signals from the low-pass filters 42 and 122 are respectively supplied to and converted into digital signals by A/D converters 43 and 123 and are then fed to timebase error correction memories 40 and 124, respectively, in which they are written on the basis of write clock signals which will be described later.

PLL circuits 48 and 128 construct write clock signal generating circuits, in which phase-compared outputs of the phase comparator circuits 49 and 129 are supplied through low-pass filters 110 and 130 to voltage controlled type oscillators 111 and 131 and thereby oscillation frequencies thereof are controlled. Oscillation signals (oscillation frequencies are as high as N times, for example, 6 times the color subcarrier frequency) from the voltage controlled-type oscillators 111 and 131 are supplied to and frequency-divided, respectively, divide-by-N frequency dividers 112 and 132, and fed to the phase comparators 49 and 129, in which they are phase-compared with the burst signals from the burst signal separating circuits 47 and 127. Then, oscillation signals from the voltage controlled-type oscillators 111 and 131, that is, clock signals containing jitter components are supplied to the A/D converters 43 and 123, and also fed to the memories 40 and 124, respectively, as read clock signals.

Phase comparator circuits 113 and 133 are reset, respectively, by horizontal synchronizing signals from the synchronizing separating circuits 46 and 126. In the phase comparator circuits 113 and 133, the frequency-divided outputs from the frequency dividers 112 and 132 are phase-compared with the burst signals from the burst signal separating circuits 47 and 127, and compared outputs thereof, namely, velocity error signals are then supplied to and converted to digital velocity error signals by A/D converters 114 and 134, respectively. Then, the digital velocity error signals are supplied, respectively, to memories 115 and 135 and are thereby written and read so that they are delayed by delay time equal to the delay time provided by the write and read of the timebase-expanded TCI signal in the memories 40 and 142.

The read clock signal generating circuit 142 which is made common to the respectively-independent circuits AK and BK of the channels A and B will be explained now. The arrangement of this read clock signal generating circuit 142 will be explained below first. A clock signal from a clock oscillator 143 (this clock oscillator 143 is a quartz oscillator and its oscillation frequency is N times, for example, 6 times as high as the color subcarrier frequency) is supplied to a divide-by-S frequency divider 144 and is thereby frequency-divided, and the divided output therefrom is fed to a phase comparator 146. A compared output from the phase comparator 146 is supplied through a low-pass filter 147 to a mixing circuit 150.

On the other hand, the digital velocity error signals read out from the memories 115 and 135 are supplied to and added together by an adder 140. An added output from the adder 140 is supplied to a ½ coefficient multiplier 141, in which the level thereof is reduced by a half and is converted to an analog signal by a D/A converter 148. The resultant analog velocity error signal is supplied to an integrator 149 and thereby is integrated. An integrated output, i.e., a lamp wave signal whose cycle is equal to one horizontal cycle period is supplied to the mixer circuit 150, in which it is mixed with the output of the low-pass filter 147. Then, an oscillation frequency of a voltage controlled-type oscillator 151 is controlled by the output of the mixing circuit 150.

An oscillation signal from the oscillator 151 is supplied to a divide-by-M frequency divider 152 (M=S in this case) and thereby is frequency-divided by M. A frequency-divided output from the frequency divider 152 is supplied to the phase comparator 146, in which it is phase-compared with the frequency divided output by S of the frequency divider 144.

Therefore, the oscillation signal from the voltage controlled-type oscillator 151 becomes equal to the signal which results from phase-modulating the reference clock signal of the clock oscillator 143 by the signal integrated by the integrator 149 which integrates the analog velocity error signal from the D/A converter 148. An oscillation signal from the oscillator 151 is supplied to D/A converters 116 and 136 and also fed to the memories 40 and 124, respectively, as a read clock signal.

Since the reproduced signals from the rotary magnetic heads Ha and Hb are the reproduced signals from the slant tracks close to each other on the magnetic tape, a correlation between the velocity errors (signals) thereof is large. For this reason, the read clock signal supplied to the timebase error correcting memories 40 and 124 for correcting the velocity errors of the reproduced signals of the rotary magnetic heads Ha and Hb can be made common.

The timebase-compressed TCI signals of two channels read out from the memories 40 and 124 by the read clock signals are supplied to and decoded by TCI decoders (not shown), that is, respective luminance signals of the TCI signals of two channels are timebase-compressed by a half, to obtain digital luminance signals. Also, the respectively line-sequence color signals are timebase-compressed, then timebase-expanded four times and simultaneously converted to color signals. Then, first and second digital color signals are obtained, and digital luminance signals of two channels and first and second digital color signals are supplied, respectively, to the D/A converters 116 and 136, in which they are converted to analog signals by the common clock signal from the read clock signal generating circuit 142. Thus, the two channel analog luminance signals and the first and second analog color signals are fed through low-pass filters 117 and 137 to output terminals 118 and 138, respectively.

While the adder 140 is used to add the digital velocity error signals from the memories 115 and 135, the velocity error signals may be added in the form of analog velocity error signals.

Further, instead of the memories 115 and 135, by effectively utilizing the memories 40 and 124, the velocity error signals may inserted into the horizontal blanking periods of the timebase-expanded TCI signals and written in and/or read out from the memories 115 and 135.

FIGS. 7A to 7G are timing charts of signals at the respective sections of the reproducing circuit shown in FIG. 6. FIGS. 7A and 7B show reproduced video signals of A and B channels in the case that the timebase-expanded TCI signals are directly recorded on the magnetic tape, respectively. As shown in FIGS. 7A and 7B, due to the spacing between the head gaps of the adjacent rotary magnetic heads, the reproduced video signal of A channel is reproduced prior to the reproduced video signal of B channel by 5 H (H is one horizontal cycle period). Accordingly, in the recording circuit of the second embodiment, the timebase-expanded TCI signal of B channel is recorded on the magnetic tape prior to the timebase-expanded TCI signal of A channel by 5 H. Thus, the output video signals of A and B channels from the timebase correcting memories 40 and 124 become signals having no difference of delay time as shown in FIGS. 7C and 7D, which can make it possible to utilize the magnetic tape more efficiently.

FIGS. 7E, 7F and 7G show velocity error signals of A and B channels and means value of these velocity error signals of A and B channels, respectively.

While the two rotary magnetic heads arranged close to each other are employed as described above, it is needless to say that three rotary magnetic heads or more may be used.

Incidentally, the color video signal recording and reproducing system is not limited thereto and other proper system may be employed.

According to the second embodiment of the present invention as described above, the timebase corrector is comprised of N (=2, 3, 4, ...) timebase error correcting memories in which there are written N reproduced video signals, which result from simultaneously reproducing video signals respectively recorded on N slant tracks by N rotary magnetic heads closely mounted, N write clock signal generating circuits for generating N write clock signals on the basis of N horizontal synchronizing signals and N burst signals separated from the N reproduced video signals and supplying the N write clock signals to the N timebase error correcting memories and the read clock signal generating circuit for generating a read clock signal which results from phase-modulating the reference clock signal by a velocity error signal obtained on the basis of N horizontal synchronizing signal and N burst signal respectively separated from the N reproduced video signals and supplying the read clock signal commonly to the N timebase error correcting memories. Therefore, the second embodiment of the timebase corrector according to the present invention can be simplified in arrangement, the power consumption can be reduced, and clocks can be prevented from being overlapped between the channels.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A timebase corrector in which an input video signal is written in a timebase error correcting memory on the basis of a clock pulse synchronized with a synchronizing signal of said input video signal and a signal written in said timebase error correcting memory is ready out on the basis of a read clock pulse synchronized with a reference synchronizing signal to thereby correct a time base of the input video signal, comprising:

a) write means for writing a video signal;
   b) a memory in which said video signal is written by said write means;
   c) means for reading a timebase corrected video signal from said memory;
   d) first synchronizing separating means for extracting a first synchronizing signal from said video signal;
   e) second synchronizing separating means for extracting a second synchronizing signal from said video signal;
   f) write-enable signal generating means for generating a write-enable signal on the basis of said first synchronizing signal to place said memory in a writable state;
   g) drop-out detecting means for detecting a drop-out of said second synchronizing signal; and
   h) means connected to the write-enable signal generating means for generating a control signal to the write-enable signal generating means by which a writing in said memory by the write means is disabled for as long as said drop-out detecting means detects a drop-out of said second synchronizing signal.

2. A timebase corrector in which an input video signal is written in a timebase error correcting memory on the basis of a clock pulse synchronized with a synchronizing signal of said input video signal and a signal written in said timebase error correcting memory is read out on the basis of a read clock pulse synchronized with a reference synchronizing signal to thereby correct a time base of the input video signal, comprising:

a) write means for writing a video signal;
   b) a memory in which said video signal is written; p1
   c) means for reading a timebase corrected video signal from said memory;
   d) first synchronizing separating means for extracting a second synchronizing signal from said video signal;
   e) second synchronizing separating means for extracting a second synchronizing signal from said video signal;
   f) write-enable signal generating means for generating a write-enable signal on the basis of said first synchronizing signal to place said memory in a writable state, wherein said write-enable signal generating means is comprised of a counter for counting the number of said first synchronizing signal and a read only memory (ROM) for generating a predetermined pattern signal in response to an output of said counter;
   g) drop-out detecting means for detecting a drop-out of said second synchronizing signal; and
   h) means for generating a signal by which a writing in said memory is disabled when said drop-out detecting means detects a drop-out of said second synchronizing signal.

3. A timebase corrector according to claim 2, wherein an output signal of said dropout detecting means is supplied to a clear terminal of said counter and clears said counter in response to said second synchronizing signal.

* * * * *